United States Patent [19]

Piejko et al.

[11] Patent Number: 5,726,265

[45] Date of Patent: Mar. 10, 1998

[54] THERMOPLASTICS HAVING A HIGH HEAT DEFLECTION TEMPERATURE AND IMPROVED HEAT STABILITY

[75] Inventors: Karl-Erwin Piejko, Gladbach; Herbert Eichenauer, Dormagen; Torsten Groth, Köln; Josef Käsbauer, Wermelskirchen; Bernd-Michael König, Gladbach, all of Germany

[73] Assignee: Bayer Aktiengesellschaft, Leverkusen, Germany

[21] Appl. No.: 588,480

[22] Filed: Jan. 18, 1996

[30] Foreign Application Priority Data

Jan. 25, 1995 [DE] Germany ............ 195 02 200.9

[51] Int. Cl.⁶ ............ C08F 222/40; C08F 220/44; C08F 212/10
[52] U.S. Cl. ............ 526/262; 526/342; 526/347
[58] Field of Search ............ 526/262, 342, 526/347

[56] References Cited

U.S. PATENT DOCUMENTS

| | | | |
|---|---|---|---|
| 3,111,501 | 11/1963 | Thompson | 260/45.5 |
| 3,652,726 | 3/1972 | Nield et al. | 260/876 |
| 3,676,404 | 7/1972 | Nield | 526/262 |
| 3,721,724 | 3/1973 | Uebele et al. | 260/880 R |
| 4,151,224 | 4/1979 | Hendy et al. | 260/876 R |
| 4,444,969 | 4/1984 | Younes | 526/262 |
| 4,567,233 | 1/1986 | Tomono et al. | 525/71 |
| 5,314,950 | 5/1994 | Singh et al. | 525/73 |
| 5,478,903 | 12/1995 | Fujioka et al. | 526/262 |

FOREIGN PATENT DOCUMENTS

| | | |
|---|---|---|
| 0 204 548 | 12/1986 | European Pat. Off. . |
| 0 295 012 | 12/1988 | European Pat. Off. . |
| 0 330 038 | 8/1989 | European Pat. Off. . |
| 0 628 578 | 12/1994 | European Pat. Off. . |
| 33 32 326 | 3/1985 | Germany . |
| 43 21 344 | 1/1995 | Germany . |
| 61-179252 | 8/1986 | Japan . |
| WO 88/02380 | 4/1988 | WIPO . |

OTHER PUBLICATIONS

English abstract of L.
Chemical Abstracts, vol. 123, Abstract No. 34425r, Abstract of EP 628,578, p. 60, (1995).
Chemical Abstracts, vol. 112, Abstract No. 218093k, Abstract of EP 330 038, p. 42 (1990).
Chemical Abstracts, vol. 103, Abstract No. 7290y, Abstract of DE 3,332,326, p. 44 (1985).
Chemical Abstracts, vol. 123, Abstract No. 33893e, Abstract of DE 4,321,344, pp. 17–18 (1995).

Primary Examiner—Joseph L. Schofer
Assistant Examiner—Wu C. Cheng
Attorney, Agent, or Firm—Sprung Kramer Schaefer & Briscoe

[57] ABSTRACT

Thermoplastics built up from N-(2-ethyl-6-methyl) phenylmaleimide and styrene, it being possible for all or some of the styrene to be replaced by at least one other monomer component.

2 Claims, No Drawings

THERMOPLASTICS HAVING A HIGH HEAT DEFLECTION TEMPERATURE AND IMPROVED HEAT STABILITY

BACKGROUND OF THE INVENTION

ABS polymers are thermoplastics which are in general distinguished by a combination of good properties, such as high toughness, high modulus of elasticity, good flow properties and good surface gloss.

If very high values for the heat resistance are also required, in addition to these properties, monomer components which lead to an increase in the glass transition temperature and therefore also to a higher heat deflection temperature must be employed during the ABS preparation.

Suitable such monomers are, for example, α-methylstyrene (cf., for example, US-PS 3 111 501), acrylamide (cf., for example, EP-A 0 330 038), maleic anhydride (cf., for example, DE-OS (German Published Specification) 33 32 326) or maleimide (cf., for example, US-PS 3 721 724).

Disadvantages in the incorporation of these monomers are the only relatively low effectiveness of α-methylstyrene or the tendency to undergo undesirable side reactions, such as, for example, crosslinking, when acrylamide, maleic anhydride or maleimide is used.

One group of comonomers which does not show these disadvantages and at the same time leads to products of high heat deflection temperature comprises N-substituted maleimides, and here in particular N-phenylmaleimide (cf., for example, US-PS 4 567 233 and literature cited therein).

The increase in the heat deflection temperature by N-substituted maleimides is in general smaller than that by unsubstituted maleimide (cf., for example, US-PS 3 721 724). Because of a relatively low loss in heat deflection temperature, aryl-substituted maleimides are particularly favourable; N-phenylmaleimide has become generally customary for industrial use.

However, one disadvantage of the polymers comprising this monomer unit is a reduced heat resistance, which manifests itself in particular in a discoloration which occurs increasingly with increasing processing temperature and which can severely limit the usefulness of the polymers.

N-Aryl-maleimides which are substituted on the aromatic ring, such as, for example, N-o-chlorophenylmaleimide, or various aryl, alkyl or cyclic substituents (cf., for example, US-PS 3 652 726 or DE-OS 43 21 344) on the N-aryl radical are furthermore known. Halogen-containing monomers, such as, for example, N-o-chlorophenylmaleimide, have the disadvantage, however, that the polymers prepared therefrom can lead to the formation of toxic degradation products when exposed to heat, and for this reason industrial thermoplastics are nowadays preferably halogen-free.

Higher processing temperatures are often necessary for large mouldings in practice, in order to obtain uniform wall thicknesses and properties which are homogeneous over the moulding. There is therefore a need for modifiers which can be used for improving the heat deflection temperature of ABS moulding compositions and have the favourable properties of the N-substituted maleimides, but which show less discoloration at higher processing temperatures.

SUMMARY OF THE INVENTION

It has now been found that if an N-phenylmaleimide specifically substituted on the aromatic ring is employed, polymers having a high heat deflection temperature and excellent heat stability are obtained.

The invention relates to thermoplastics built up from N-(2-ethyl-6-methyl)-phenylmaleimide and styrene, it being possible for all or some of the styrene to be replaced by at least one comonomer component, preferably chosen from the group consisting of acrylonitrile, methyl methacrylate and α-methylstyrene.

DETAILED DESCRIPTION OF THE INVENTION

Preferred thermoplastic resins are built up from N-(2-ethyl-6-methyl)phenyl-maleimide, styrene and acrylonitrile, and particularly preferred thermoplastic resins are built up from a) 5 to 50 parts by weight, preferably 10 to 35 parts by weight, of N-(2-ethyl-6-methyl)phenylmaleimide, b) 20 to 90 parts by weight, preferably 30 to 75 parts by weight, of styrene and c) 5 to 40 parts by weight, preferably 10 to 30 parts by weight, of acrylonitrile.

The invention furthermore relates to thermoplastic moulding compositions of the ABS type, comprising A) 10 to 100% by weight of at least one graft rubber and B) 90 to 0% by weight of at least one rubber-free thermoplastic vinyl resin, N-(2-ethyl-6-methyl)phenylmaleimide having been employed as one monomer component for the preparation of at least one of components A and B.

Preferred thermoplastic moulding compositions according to the invention of the ABS type comprise A) 10 to 100% by weight of a graft rubber prepared from i) 3 to 80 parts by weight, preferably 5 to 70 parts by weight, of at least one rubber component, preferably polybutadiene, in the presence of which ii) 5 to 50 parts by weight, preferably 10 to 35 parts by weight, of N-(2-ethyl-6-methyl)phenylmaleimide and iii) 95 to 50 parts by weight, preferably 90 to 65 parts by weight, of at least one other monomer component chosen from the group consisting of styrene, acrylonitrile, methyl methacrylate and α-methylstyrene have been polymerized, and B) 90 to 0% by weight of a rubber-free thermoplastic vinyl resin built up from at least two monomer components chosen from the group consisting of styrene, acrylonitrile, methyl methacrylate and α-methylstyrene or A) 10 to 95% by weight of a graft rubber prepared from i) 3 to 80 parts by weight, preferably 5 to 70 parts by weight, of at least one rubber component, preferably polybutadiene, in the presence of which ii) 5 to 100 parts by weight, preferably 10 to 95 parts by weight, of at least two monomer components chosen from the group consisting of styrene, acrylonitrile, methyl methacrylate and α-methylstyrene have been polymerized, and B) 90 to 5% by weight of a rubber-free thermoplastic vinyl resin built up from iv) 5 to 50 parts by weight, preferably 10 to 35 parts by weight, of N-(2-ethyl-6-methyl)phenylmaleimide and v) 95 to 50 parts by weight, preferably 90 to 65 parts by weight, of at least one monomer component chosen from the group consisting of styrene, acrylonitrile, methyl methacrylate and α-methylstyrene.

The rubbers employed according to the invention for the preparation of the graft rubbers must have a glass transition temperature below 0° C. Suitable rubbers are, for example: diene rubbers, that is to say homopolymers of conjugated dienes having 4 to 8 C atoms, such as butadiene, isoprene or copolymers thereof with up to 60% by weight, preferably 1 to 30% by weight, of a vinyl monomer, for example acrylonitrile, methacrylonitrile, styrene, α-methylstyrene, $C_1$-$C_4$-alkylstyrenes, $C_1$-$C_6$-alkyl acrylates and methacrylates, alkylene glycol diacrylates and -methacrylates and divinylbenzene;

acrylate rubbers, that is to say homo- and copolymers of $C_1$-$C_{10}$-alkyl acrylates, for example homopolymers of ethyl acrylate, butyl acrylate or 2-ethylhexyl acrylate, or copolymers with up to 40% by weight, preferably not more than 10% by weight, of mono-vinyl monomers, for example styrene, acrylonitrile, vinyl butyl ether, acrylic acid (esters), methacrylic acid (esters) or vinylsulphonic acid. Those acrylate rubber homo- and copolymers which comprise 0.01 to 8% by weight of divinyl or polyvinyl compounds and/or N-methylolacrylamide (or -methacrylamide) derivatives which act as crosslinking agents, for example divinylbenzene or triallyl cyanurate, and where the rubber contains C=C double bonds are preferably employed;

terpolymer rubbers, that is to say copolymers of mono-olefinic hydrocarbons, for example ethylene, propylene and dienes, for example butadiene or cyclopentadiene.

Polybutadiene rubbers and SBK rubbers with up to 30% by weight of copolymerized styrene are preferred, and polybutadiene is particularly preferred.

The gel contents of the rubber polymers to be employed according to the invention can be varied within wide ranges. Gel-free, that is to say non-cross-linked, rubbers are preferred if the bulk or solution process is used, and at least partly crosslinked rubbers, preferably having gel contents of at least 50%, are preferred if the emulsion process is used for preparation of the rubber-containing graft polymers.

The graft rubbers can in principle be prepared by all the usual processes, and bulk or solution polymerization and emulsion polymerization are particularly preferred. The size of the graft rubber particles can be varied within wide limits, for example average particle diameters from about 30 nm to about 10 000 nm are possible in principle. Average particle diameters from about 50 nm to about 500 nm (emulsion polymerization) or from about 500 nm to 5 000 nm (bulk or solution polymerization) are preferred. Average particle diameters here mean $d_{50}$ values which have been determined by ultracentrifuge measurement (cf. W. Scholtan and H. Lange in Kolloid-Z. und Z. Polymere 250, pages 782–796 (1972)) or by measurement of electron microscope photographs.

Grafting monomers which are suitable for preparation of the graft rubbers are, in particular, styrene, acrylonitrile, methyl methacrylate and α-methylstyrene; compounds which are suitable as other comonomers, preferably in small amounts, are compounds having one vinyl group, preferably $C_1$-$C_4$-alkyl-substituted styrenes, such as, for example, vinyltoluene, in particular p-methylstyrene, methacrylonitrile, esters of acrylic acid and/or methacrylic acid with $C_1$-$C_8$-aliphatic or cycloaliphatic alcohols, for example n-butyl acrylate or 2-ethylhexyl acrylate, vinyl acetate, acrylic acid or methacrylic acid, or mixtures thereof.

The abovementioned monomer components are likewise suitable for preparation of the rubber-free vinyl resins.

In addition to the monomers, molecular weight regulators can be employed both for preparation of the graft rubbers and for preparation of the rubber-free vinyl resins, preferably in amounts of 0.05 to 2% by weight, particularly preferably in amounts of 0.1 to 1% by weight (in each case based on the total amount of monomer). Suitable molecular weight regulators are, for example, mercaptans, such as n-dodecylmercaptan or t-dodecylmercaptan, or dimeric α-methylstyrene.

The monomer component N-(2-ethyl-6-methyl) phenylmaleimide of the formula (I)

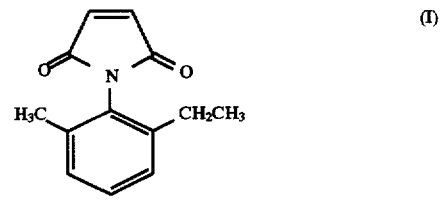

employed for preparation of the thermoplastic resins according to the invention and for preparation of the thermoplastic moulding compositions according to the invention of the ABS type is known and is described, for example, by E. Jedlovska et at., Collect. Czech. Chem. Commun. 56 (1991), pages 673–684.

The thermoplastics according to the invention which contain incorporated structural units derived from (I) are prepared by free radical polymerization processes which are known; the processes of bulk and solution polymerization and of emulsion polymerization are preferred, the customary solvents and auxiliaries (for example initiators, emulsifiers) being employed. The thermoplastic resins preferably have average molecular weights $\overline{M}_w$ of 10 000 to 300 000, and $\overline{M}_w$ values from 20 000 to 200 000 are particularly preferred.

Examples of corresponding thermoplastic resins according to the invention are polymers of styrene/(I) mixtures, α-methylstyrene/(I) mixtures, styrene/acrylonitrile/(I) mixtures, α-methylstyrene/acrylonitrile/(I) mixtures, styrene/methyl methacrylate/(I) mixtures, methyl methacrylate/(I) mixtures, acrylonitrile/methyl methacrylate/(I) mixtures, styrene/acrylonitrile/αmethylstyrene/(I) mixtures and styrene/acrylonitrile/methyl methacrylate/(I) mixtures, and preferred thermoplastic resins are built up from styrene/acrylonitrile/(I) mixtures.

Particularly preferred thermoplastic resins are those built up from a) 5 to 50 parts by weight, especially preferably 10 to 40 parts by weight, of (I), b) 20 to 90 parts by weight, especially preferably 30 to 75 parts by weight, of styrene and c) 5 to 40 parts by weight, especially preferably 10 to 30 parts by weight, of acrylonitrile.

The thermoplastic moulding compositions according to the invention of the ABS type which contain incorporated structural units derived from (I) can also be prepared by known processes of free radical polymerization. Processes of bulk and solution polymerization in which graft robbers having rubber contents of 3 to 30% by weight, particularly preferably of 5 to 20% by weight, preferably result and of emulsion polymerization in which graft rubbers having rubber contents of 20 to 80% by weight, particularly preferably 30 to 70% by weight, are preferably prepared are preferred. The content of incorporated monomer (I) can be chosen freely both in the thermoplastic resin and in the moulding composition of the ABS type, and the amount of incorporated monomer (I) in general depends on the required heat deflection temperature. In principle, also the contemporary use of N-(2-ethyl-6-methyl)phenylmaleimide and other maleimide derivatives, preferably N-phenylmaleimide, is possible for the production of rubber-free or rubber-containing thermoplastic resins.

The necessary and expedient additives, for example antioxidants, UV stabilizers, peroxide-destroying agents, antistatics, lubricants, mould release agents, time-proofing agents, fillers or reinforcing substances (glass fibers, carbon fibers and the like) or colouring agents, can be added to the polymers and moulding compositions according to the invention during preparation, working up, further processing and, final shaping.

The final shaping can be carried out on commercially available processing units and includes, for example, processing by injection moulding, sheet extrusion, if appropriate with subsequent thermoforming, cold forming, extrusion of pipes and profiles and calender processing.

In the following examples, the parts stated are always parts by weight and the percentages stated are always percentages by weight, unless stated otherwise.

EXAMPLES

Example 1

Preparation of styrene/acrylonitrile/N-aryl-maleimide polymers 1.1 Polymers according to the invention 1.1.1 Styrene/acrylonitrile/N-(2-ethyl-6-methyl) phenylmaleimide polymer (51.8/39.5/8.7 mol%)

916 g of water and 4.5 g of $C_9$–$C_{18}$-alkylsulphonic acid sodium salt are initially introduced into a reactor.

The initial mixture is heated to 65° C. and 20 g of a monomer mixture as in feed 1 and 6 g of a 5.4% strength by weight aqueous potassium persulphate solution are added. Thereafter, feeds 1 and 2 are metered into the mixture in parallel at 65° C. in the course of 6 hours, and the mixture is then stirred at 80° C. for a further 3 hours.

Feed 1: 195 g of N-(2-ethyl-6-methyl)phenylmaleimide 218 g of acrylonitrile 562 g of styrene 2.5 g of tert-dodecylmercaptan Feed 2: 610 g of water 18.2 g of $C_9$–$C_{18}$-alkylsulphonic acid sodium salt A latex having a solids content of 37% by weight is obtained. The latex is stabilized with phenolic antioxidant (0.2% by weight, based on the solid) and coagulated with a magnesium salt solution. The solid is washed and dried; the polymer yield is quantitative. The polymer has a glass transition temperature $T_g$ (determined by means of differential thermoanalysis DTA) of 133° C.

1.1.2 Styrene/acrylonitrile/N-(2-ethyl-6-methyl) phenylmaleimide polymer (54.4/41.5/4.1 mol%)

The preparation was carried out analogously to 1.1.1 and the glass transition temperature $T_g$ is 125° C.

Comparison Polymers

Styrene/acrylonitrile/N-aryl-maleimide polymers are prepared with the following imides (mot% content) analogously to recipe 1.1.1:

|  |  | $T_g$ [°C.] |
| --- | --- | --- |
| 1.2.1 | N-Phenylmaleinimide (10, 6) | 134 |
| 1.2.2 | N-2,6-Diethylphenylmaleinimide (8.2) | 131 |
| 1.2.3 | N-3-Methylphenylmaleinimide (9.9) | 133 |
| 1.2.4 | N-2-Isopropylphenylmaleinimide (8.7) | 135 |
| 1.2.5 | N-2,6-Dimethylphenylmaleinimide (9.2) | 139 |

Example 2

ABS moulding compositions 45 parts of the terpolymers 1.1 or 1.2 are mixed with 25 parts of styrene/acrylonitrile copolymer (weight ratio 72/28, $M_w$=95 000 g/mol) and 30 parts of an ABS graft polymer having a polybutadiene robber content of 55% by weight and a styrene/acrylonitrile copolymer grafted shell. The polybutadiene rubber has an average particle diameter of 410 nm and was grafted with a styrene/acrylonitrile mixture (weight ratio 72:28) in emulsion by known processes. 2 parts of a processing auxiliary (pentaerythritol tetrastearate) are added to the mixture, after which the mixture is kneaded at 200° C. on an internal header until a homogeneous mass is formed. The mass is milled, granulated and processed to test specimens (80 mm×10 mm×4 mm) on an injection moulding machine at 240° C. and 300° C.

The mechanical properties of the test specimens are in each case at a good level for heat resistant ABS moulding compositions.

The intrinsic colour of the test specimens is evaluated by a visual method.

TABLE 1

Evaluation of the intrinsic colour of ABS test specimens comprising polymers 1.1 and 1.2 (comparison polymer)

| ABS moulding composition | Polymer type in the ABS moulding composition | Level of intrinsic colour*) at processing temperatures of | |
| --- | --- | --- | --- |
| | | 240° C. | 300° C. |
| 2.1 | 1.1.1 | 3 | 4 |
| 2.2.1 | 1.2.1 | 8 | 8 |
| 2.2.2 | 1.2.2 | 4 | 7 |
| 2.2.3 | 1.2.3 | 6 | 8 |
| 2.2.4 | 1.2.4 | 6 | 7 |
| 2.2.5 | 1.2.5 | 4 | 7 |

*)Scale from 1 to 10, 1 =very pale intrinsic colour (almost white) 10 = very dark intrinsic colour (dark brown)

From the comparison of the glass transition temperatures of the polymer 1.1.1 and of the comparison polymers 1.2.1 to 1.2.5, no significant influence of the substituents on the phenyl ring of the particular N-arylmaleimide used on softening is detected in the context of measurement accuracy, that is to say all the N-arylmaleimides investigated are equally suitable for improving the heat deflection temperature of ABS moulding compositions.

From the evaluation of the intrinsic colour of the ABS moulding compositions 2.1 and 2.2.1 to 2.2.5 prepared with the polymer 1.1.1 according to the invention and the comparison polymers 1.2.1 to 1.2.5, dearly the best intrinsic colour already results at the low processing temperature of 240° C. with the test specimen from moulding composition 2.1. Under exposure to higher temperatures (processing temperature 300° C.), the high heat stability of the moulding composition according to the invention compared with the comparison moulding compositions becomes particularly clear.

What is claimed is:

1. A thermoplastic built up from a) 5 to 50 parts by weight of N-(2-ethyl-6-methyl) phenylmaleimide, b) 20 to 90 parts by weight of styrene and c) 5 to 40 parts by weight of acrylonitrile.

2. The thermoplastic of claim 1, built up from a) 10 to 35 parts by weight of N-(2-ethyl-6-methyl) phenylmaleimide, b) 30 to 75 parts by weight of styrene and c) 10 to 30 parts by weight of acrylonitrile.

* * * * *